(12) United States Patent
Flagg

(10) Patent No.: X7343
(45) Date of Patent: Dec. 28, 1832

(54) SHINGLES & STAVES, HEADING, &C.

(76) Inventor: David Jr. Flagg

David Flagg Jun.r

Letters Patent

The Schedule referred to in these Letters Patent and making
part of the same, containing a description in the words of the said
David Flagg Jun.r himself of his improvement in the Machine
for making Shingles &c.

Be it known that I, David Flagg Jun.r of the City, County and
State of New York, have made an improvement in the Machine for
making Shingles, Staves, headings &c: which is described as follows
This Machine consists of a frame to support the Machinery; a
gate working vertically with a frow or knife to cut the shingle
from the bolt a vibrating beam attached to the gate and to a crank
shaft to work the frow up and down a gallows or frame to
support the vibrating beam at its centre two knives to shave the
shingles with screws and wedges to graduate their distance apart and to
secure them a driver working horizontally, to drive the shingle
through between the knives, which driver being attached to the
wrist of the crank shaft by a pitman a channel or casing in
through which the shingles pass, lined with [illegible] to secure them
a rest or table to receive the shingle bolts and a crank shaft
to which the power is applied to work the Machine. The frame
consists of a solid foundation of timber, or frame work, into
which are mortised three posts supporting a long piece of timber
forming the principal part of the frame. Two other posts are let
into the foundation supporting a shorter piece of timber, than
the one last mentioned, placed parallel to, and at a short distance
from it, and connected by cross pieces, between these two pieces of
timber is placed the band wheel hereafter mentioned. The two
posts at the left hand end of the machine (in looking towards
the front, extend above the long piece of timber, having mortices
and or recesses cut in the front side thereof into which a broad
thin piece of wood forming the back of the channel or casing
hereafter to be described. This piece of wood is keyed tight by
wooden keys or wedges. The gate working vertically within
fender posts, is formed by two pieces of scantling placed par=
allel with each other, and connected at top by a cap piece of
timber and at bottom by a broad plate of iron or steel brought
to a sharp edge, frow or knife, which cuts the shingle from the
block or bolt. The fender posts are let into the foundations.
and locked to the long timber before described. The vibrating
beam is a stout piece of timber nearly the length of the
whole frame vibrating on a strong bolt passing through its
centre, and the top of the gallows, its left end is connected to the
gate by a pitman, and its right hand end to the wrist of the
crank shaft by another pitman or connecting rod. The gallows
or frame supporting the vibrating beam, consists of four posts
mortised into the foundation timbers at a convenient
distance apart, say ten feet, and nearly meeting at top
connected together by ties or braces. The knives to shave the
shingles are made of steel and brought to a sharp edge; having a
slight depression or cavity on its sides near each end to receive
the points of the regulating screws. these knives are placed
inclining at an angle of about [illegible] degrees, with graduating
wedges between them at top and bottom, the one at bottom
being thicker than the one at top in order to fix the knives
wide apart at bottom to form the but, and close together
at top to form the point of the shingle. The regulating screws
for securing the knives pass through female screws in the
ends of the straps of iron (which secure the casing or
channel to be hereafter described) between these the knives
are placed, the points of the screws being in the cavities
before mentioned. The driver is a rectangular piece of timber
having an iron plate fastened on its front at the end which
comes comes in contact with the shingle. This plate has a groove on
its outer edge. There are also two straps of iron secured to the
front end of the driver to keep the shingle in place. The driver
is connected with the wrist of the crank shaft by a pitman
and it slides in grooves or ways formed by four pieces of timber
set edgewise, secured to the frame by bolts and screws. The channel
or casing through which the shingles pass is formed by the broad
board keyed into the left hand posts before mentioned, and
which forms the back. the front being formed by two thin boards
placed at a short distance from the back board, having thin strips
of wood between them and the back at top secured by screw bolts pass
ing through the iron straps and through the boards. The inside
of this channel or casing is lined with horizontal strips of iron
or steel placed in parallel lines part of each strip being plain
and part being cut into saw teeth to score the shingle as it pass
es through the channel previous to its meeting the knives.
Two iron guides or bars are placed in the lower part of the
open space of the casing against which the shingle bolt rests.
At the upper part of this open space is a saw to score the shingle
near its point. [illegible]. The rest or table to receive the
shingle bolt is a thick piece of timber resting on the ends of
two vertical springs keyed to the face of the fender posts and
brought immediately before the open part of the casing.
Between the springs is a horizontal anti friction roller. The
crank shaft to which the power is applied and by which
the Machine is worked is placed across the frame at the
right hand end of the same; its journals turning in boxes
on the longitudinal parallel pieces of the frame before men
tioned. The driving pulley is put on this shaft, and a
balance wheel is also put on it to steady the motion of
the machine — Operation — The Machine being put in
motion the shingle bolt is placed on the rest against the
guide plates, and as the crank shaft revolves the end of end of the vibrating beam is brought down, whilst its other end ascends with the gate, and frow or knife which cuts off a shingle, and the next half revolution of the crank forces forward the driver with the shingle carrying it through the casing between the scoring saws and knives where it is shaped and shaved. The next half revolution brings back the driver, and carries up the frow cutting off another shingle which is shaved as before. and in this manner the operation is continued. To the vibrating beam may be attached several saw gates with saws for sawing boards &c. likewise to saw the timber into shingle bolts.
A cylindrical wheel with knives on its periphery is attached to and worked by this Machine for jointing the shingles. For a further illustration of my invention I refer to the Model and drawing of the same deposited in the Patent Office. What I claim as my invention and for which I solicit Letters Patent is the before described Machine for making shingles, staves, headings &c. particularly the gate with the frow or knife, the application of the vibrating beam to work the gate; the manner of regulating and securing the knives by the screws and wedges, the peculiar construction of the driver, and the channel or casing lined with saws to score the shingles.

Done at the City of Washington this 18th day of December 18[illegible].

Witnesses
William P. Elliot,
Chas. Bulfinch Jun.

David Flagg Sen.

Ex'd.
W.G.C.

[illegible]

United States Patent
Patent No.: X7343
X7343
*D. Flagg,*
*Horse Power.*
*Patented Dec. 28, 1832.*
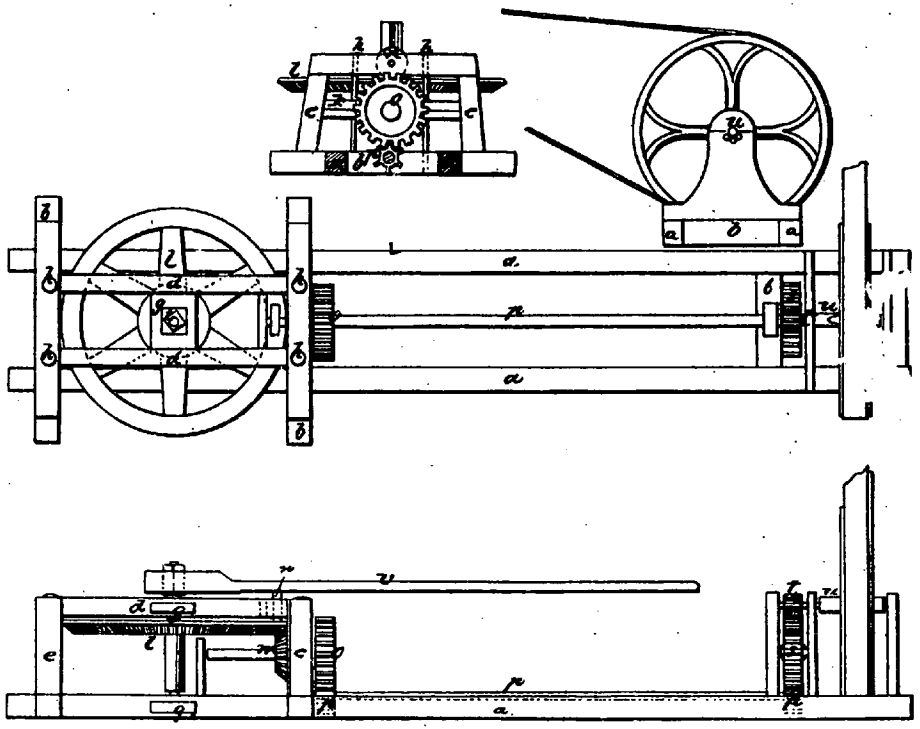
AM. PHOTO-LITHO. CO. N.Y. (SIMMONS'S PROCESS)